(12) United States Patent
Shingu et al.

(10) Patent No.: US 7,657,061 B2
(45) Date of Patent: Feb. 2, 2010

(54) COMMUNICATION APPARATUS AND SYSTEM HANDLING VIEWER IMAGE

(75) Inventors: Jun Shingu, Kanagawa (JP); Jun Miyazaki, Kanagawa (JP); Kazutaka Hirata, Kanagawa (JP); Toshiya Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1189 days.

(21) Appl. No.: 10/933,461

(22) Filed: Sep. 3, 2004

(65) Prior Publication Data
US 2005/0179785 A1   Aug. 18, 2005

(30) Foreign Application Priority Data
Feb. 17, 2004   (JP) ............................. 2004-040400

(51) Int. Cl.
*G06K 9/00*   (2006.01)
(52) U.S. Cl. ..................................... 382/103
(58) Field of Classification Search .................. 382/103
See application file for complete search history.

(56) References Cited

U.S. PATENT DOCUMENTS

| | | | |
|---|---|---|---|
| 6,473,096 B1 | 10/2002 | Kobayashi et al. | |
| 6,761,308 B1 * | 7/2004 | Hanna et al. | 235/379 |
| 6,853,700 B1 * | 2/2005 | Numata et al. | 378/4 |
| 2003/0128390 A1 * | 7/2003 | Yip et al. | 358/1.18 |
| 2005/0052338 A1 | 3/2005 | Suzuki et al. | |

FOREIGN PATENT DOCUMENTS

| | | |
|---|---|---|
| JP | 07-262274 A | 10/1995 |
| JP | 09-319940 A | 12/1997 |
| JP | 2000-105583 A | 4/2000 |
| JP | 2000-187542 A | 7/2000 |
| JP | 2001-128134 A | 5/2001 |
| JP | 2002-22918 A | 1/2002 |
| JP | 2003-87725 A | 3/2003 |
| JP | 2004-038434 A | 2/2004 |
| WO | WO 03026289 A1 | 3/2003 |

OTHER PUBLICATIONS

Japanese Office Action dated Aug. 18, 2009 in corresponding Japanese Patent Application No. 2004-040400.

* cited by examiner

*Primary Examiner*—Tom Y Lu
(74) *Attorney, Agent, or Firm*—Sughrue Mion, PLLC

(57) ABSTRACT

A communication apparatus includes a display device, a camera, a database, and a server. Display information is displayed on the display device. A viewer image of a first viewer, who is watching and listening to the display information, is taken with the camera. The display information is associated with the viewer image that has been taken with the camera. The display information and the viewer image are stored in the database that is connected over a network. The server reproduces the viewer image in association with the display information. A second viewer who has watched and listened to the viewer image of the first viewer is able to know the reaction of the first viewer, and thus new communication resulted from the reaction of the first viewer can be expected.

28 Claims, 20 Drawing Sheets

Fig. 3

DATABASE 4

| VIEWER IMAGE | ASSOCIATED DISPLAY INFORMATION | TIME TO START SHOOTING | TIME TO END SHOOTING | RECOGNITION RESULT OF VOICE AND SOUND | SHOOTING SITE | USER OPERATION |
|---|---|---|---|---|---|---|
| VIEWER IMAGE S1 | DISPLAY INFORMATION D1 | 1:38 PM | 1:45 PM | It's great | POINT B | DISPLAY A POSTER |
| VIEWER IMAGE S2 | DISPLAY INFORMATION D2 | | | | | |
| VIEWER IMAGE S3 | DISPLAY INFORMATION D3 | | | | | |
| VIEWER IMAGE S4 | DISPLAY INFORMATION D3 | | | | | |
| VIEWER IMAGE S5 | DISPLAY INFORMATION D4 | | | | | |
| VIEWER IMAGE S11 | DISPLAY INFORMATION D11 | t2 | t5 | | | |
| VIEWER IMAGE S12 | DISPLAY INFORMATION D12 | t1 | t3 | | | |
| VIEWER IMAGE S13 | DISPLAY INFORMATION D13 | t4 | t6 | | | |

Fig. 16
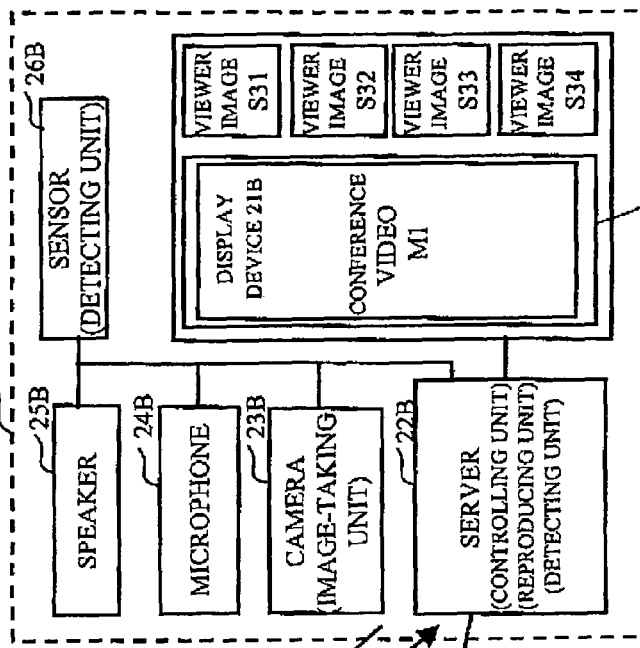
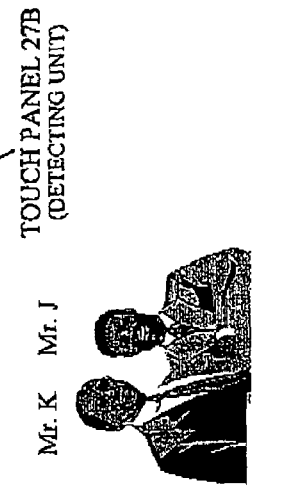
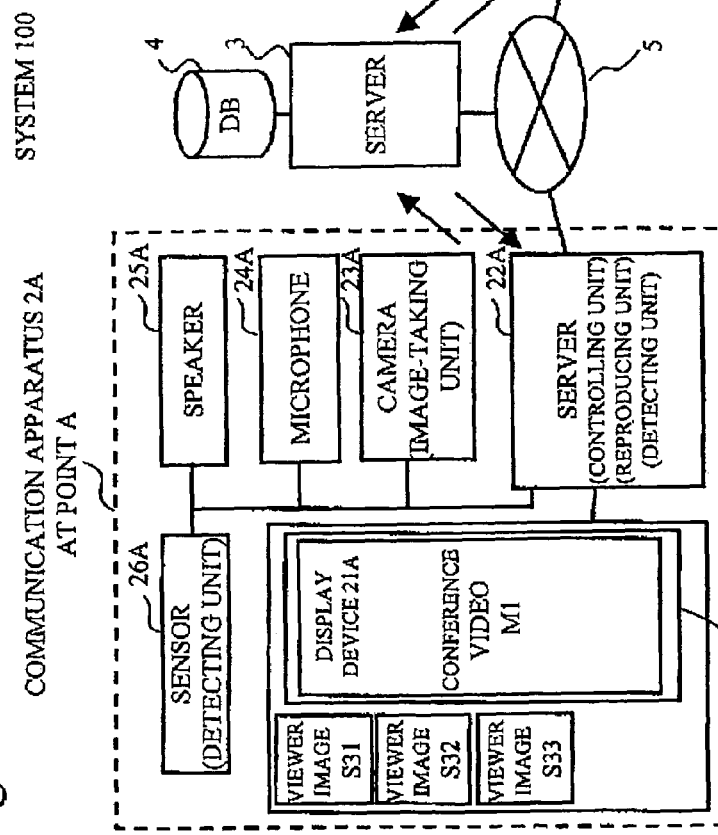
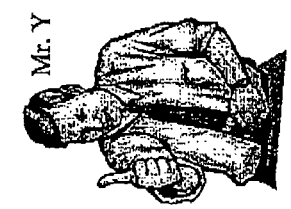

COMMUNICATION APPARATUS AND SYSTEM HANDLING VIEWER IMAGE

BACKGROUND OF THE INVENTION

1. Field of the Invention

This invention relates to a communication apparatus, system and display method capable of handling viewer images.

2. Description of the Related Art

Generally, a camera is setup at a place attracting crowds such as an electronic bulletin board or the like in order to capture images of aspects in front of the bulletin board. Some proposals of such apparatus for analyzing and making use of the captured images have been reported.

For example, Japanese Laid-Open Patent Application Publication No. 2002-22918 proposes to provide an apparatus with a camera in order to capture an image, process the captured image, and show who and how many people are watching displayed information on the electronic bulletin board. Japanese Laid-Open Patent Application Publication No. 2000-105583 proposes to provide an apparatus having a display board for displaying advertisements, a camera for shooting a viewer, and attribute judgment means for judging a character attribute related to the viewer and analyzing character information. This proposal enables to make a quantitative judgment on the advertisement by accumulating the attribute judgment results related to the viewer of content.

Japanese Laid-Open Patent Application Publication No. 2003-87725 proposes to provide an apparatus for recording both audio-visual information and static image information. When the static image information is displayed on multiple display devices, the information being displayed on all these display devices is recorded, and thus the reproduction of the content is controlled by using a reproduction list of the static image information corresponding to the audio-visual information. That is, this proposal enables to control the static images that are made of audio-visual information, a presentation, and the like, all together in the same dimension. Japanese Laid-Open Patent Application Publication No. 2000-187542 proposes to provide an apparatus for creating a scenario that synchronizes the sound of the presentation with a multi-media content to be used.

Japanese Laid-Open Patent Application Publication No. 2002-22918 includes the apparatus that enables to show how many people or who are watching a video; however, there has the problem in that it is hard to know how a viewer is watching the information being displayed, for example, whether the viewer is seriously watching or with whom the viewer is talking while watching. As a result, new communication with a person who is watching the viewer will not be developed.

Japanese Laid-Open Patent Application Publication No. 2000-105583 includes the apparatus that enables to show a reaction of the viewer of content; however, new communication resulted from the reaction of another viewer will not be developed. Japanese Laid-Open Patent Application Publication No. 2003-87725 includes the apparatus that enables to control audio-visual and static images all together in the same dimension; however, information on the viewer, who is watching and listening to the information on audio-visual and static images, cannot be obtained. As a result, new communication will not be developed.

Japanese Laid-Open Patent Application Publication No. 2000-187542 includes the apparatus that shoots a person who delivers information such as a presentation; however, it is hard to know what of the information a person who receives the information has an interest in. As a result, there has the problem in that new communication resulted from the reaction of another viewer will not be developed.

SUMMARY OF THE INVENTION

The present invention has been made in view of the above circumstances and provides a communication apparatus, system, and display method that enable to develop new communication resulted from the reaction of another viewer.

According to one aspect of the present invention, there is provided a communication apparatus comprising: a display device that displays display information; an image-taking unit that takes a viewer who is watching and listening to the display information; a controlling unit that saves a viewer image on a storage device, the viewer image having been taken with the image-taking unit and being saved in association with the display information; and a reproducing unit that reproduces the viewer image in association with the display information.

According to another aspect of the present invention, there is provided a communication apparatus comprising: a receiving unit that receives a viewer image of a viewer from a storage device, the viewer having watched and listened to display information, and the viewer image being saved in association with the display information; and a reproducing unit that reproduces the viewer image in association with the display information.

According to still another aspect of the present invention, there is provided a communication apparatus comprising: a display device that displays information; an instruction input unit that receives instruction input data of a viewer who has watched and listened to the information; an instruction input position specifying unit that specifies an instruction input position of the viewer based on the instruction input data; an instruction input direction specifying unit that specifies an instruction input direction of the viewer; and a reproducing unit that adjusts a display position on the display device, based on the instruction input position of the viewer and the instruction input direction of the viewer.

According to yet another aspect of the present invention, there is provided a display method comprising the steps of: taking a viewer image of a first viewer who is watching and listening to first display information that is displayed on a first display device; saving on a storage device, the viewer image of the first viewer, in association with the display information; and reproducing the viewer image of the first viewer in association with the first display information.

BRIEF DESCRIPTION OF THE DRAWINGS

Embodiments of the present invention will be described in detail based on the following figures, wherein:

FIG. 3 is a table showing the viewer images stored in a database;

FIG. 16 is a diagram of a system according to a third embodiment of the present invention;

DESCRIPTION OF THE PREFERRED EMBODIMENTS

Figure 1:
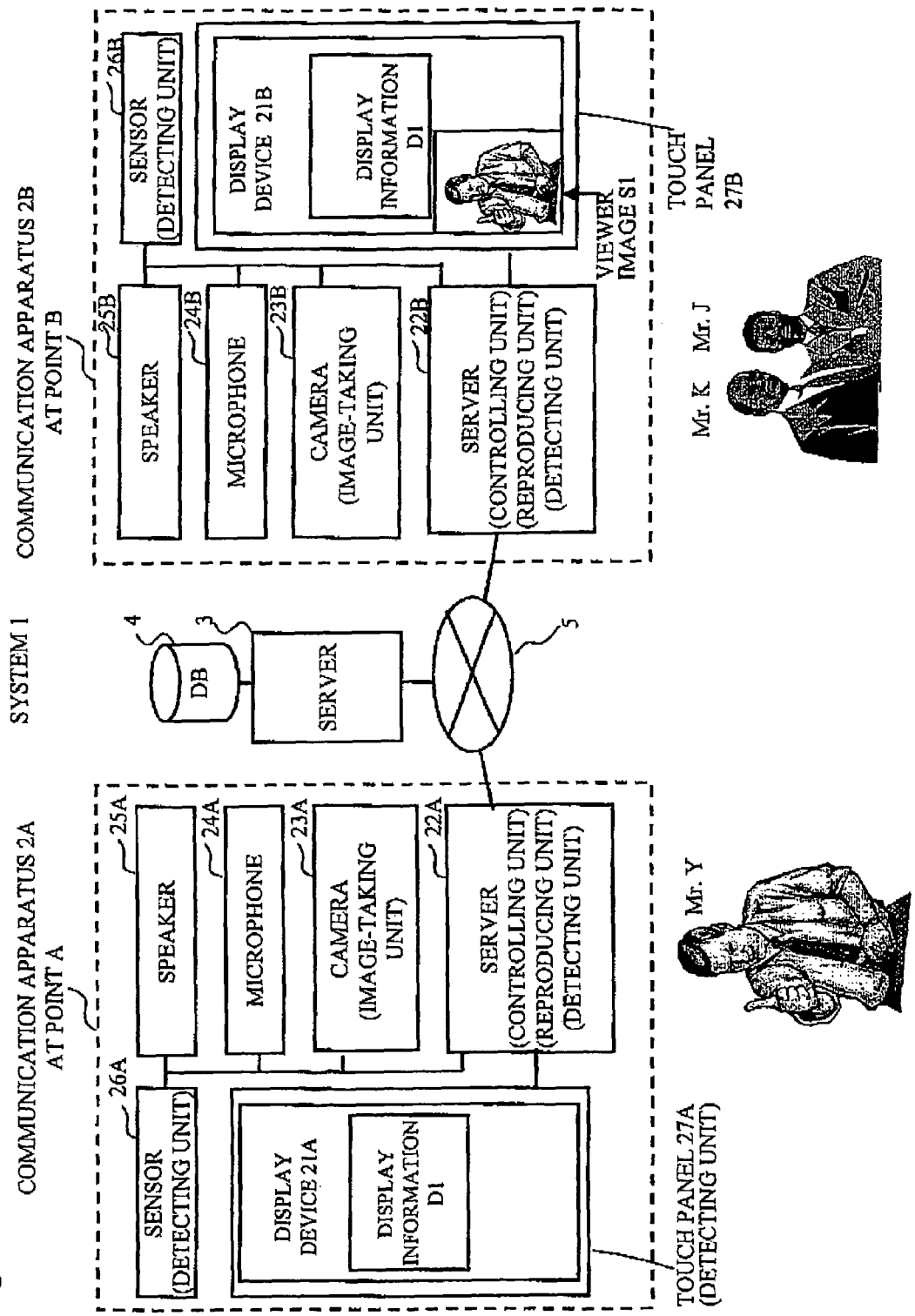
FIG. 1 is an overall block diagram of a system according to a first embodiment of the present invention.

FIG. 1 is an overall block diagram of a system according to a first embodiment of the present invention. As shown in FIG. 1, a system 1 has multiple communication apparatuses 2A and 2B, a server 3, and a database 4. The communication apparatuses 2A and 23 and a server 3 are connected via a network 5. The communication apparatus 2A is set up at a point A. Mr. Y is supposed to be watching display information D1 displayed on the communication apparatus 2A. The communication apparatus 2B is set up at a point B. Mr. K and Mr. J are supposed to be watching the display information D1 and a viewer image S1, which are displayed on the communication apparatus 2B.

The server 3 includes a CPU (Central Processing Unit), a RAM (Random Access Memory), a ROM (Read Only Memory), and the like. In the database 4, stored is the display information D1, the viewer image S1, and the like. The display information D1 is displayed on display devices 21A and 21B. The viewer image S1 is the image of the viewer who has watched and listened to the display information D1. The display information, the viewer image, and the like in the database 4 are shared and used by the communication apparatuses 2A and 25 that are set up at multiple points. There may be one or more databases 4, and may be distributed at multiple places. The network 5 may include the Internet, a LAN (Local Area Network), and a WAN (Wide Area Network), for example.

The communication apparatus 2A has a display device 21A, a server 22A, a camera 23A, a microphone 24A, a speaker 25A, a sensor 26A, and a touch panel 27A. The communication apparatus 2B has a display device 21B, a server 22B, a camera 23B, a microphone 24B, a speaker 25B, a sensor 26B, and a touch panel 27B. Hereinafter devices included in the communication apparatus 28 will be enclosed within parenthesis, in the case where each of the devices has the same function as the corresponding device in the communication apparatus A.

The display device 21A (21B) displays the display information D1, the viewer image S1, and various menus. The display device 21A (21B) is made of a large-screen display such as a plasma display. The display information D1 may include static information such as web page, text, and image, and also includes dynamic information such as video, sound, and music. The display device 21A (21B) has the touch panel 27A (27B). A viewer is able to input various instructions and messages with the touch panel 27A (27B). Information detected by the touch panel 27A (27B) is transmitted to the server 22A (22B). The touch panel 27A (27B) is capable of detecting the presence of a viewer. The touch panel 27A (27B) is used as an input device here; however, the input device such as a keyboard or a mouse may be used.

The camera 23A (23B) is used for shooting a viewer who is watching and listening to the display information D1 that is being displayed on the display device 21A (21B). The camera 23A (23B) includes a camera that captures static or moving images The image obtained by the camera 23A (23B) is transmitted to the server 22A (22B). The microphone 24A (24B) obtains a sound and voice of the viewer who is watching and listening to the display information D1. The sound and voice obtained by the microphone 24A (24B) are transmitted to the server 22A (22B). The speaker 25A (25B) reproduces the sound and voice that are synchronized with the image displayed on the display device 21A (21B).

The sensor 26A (26B) detects the presence of the viewer who is existent within a predetermined area. The sensor 26A (26B) includes a range sensor, for example, such as an infrared radiation sensor or a sensor for receiving RFID (Radio Frequency Identification) that is attached to a person. The sensor 26A (26B) transmits a detection signal to the server 22A (22B), when the person and the display device 21A (218) are located within an N-meter-range.

The server 22A (22B) controls each of the entire communication apparatuses. Each of the servers 22A and 22B includes a CPU, a ROM, a RAM, and the like, for example. When the server 22A (22B) detects an input signal from the touch panel 27A (27B), this detection means the presence of a viewer in front of the communication apparatus 2A (23). The server 22A (22B) detects, based on the result of image processing of the image obtained by the camera 23A (233), the presence of a viewer, the face direction of the viewer, and whether the viewer is looking at the display device 21A (21B). The server 22A (22B), based on the result of signal processing of the sound and voice obtained by the microphone 24A (24B), detects the presence of the viewer.

The server 22A (22B) functions as a controlling unit, and stores the viewer image obtained by the camera 23A (23B) in the database 4 (a predetermined storage device), in association with the display information. The server 22A (22B) functions as a receiving unit that receives the viewer image from the database 4, and also functions as a reproducing unit that reproduces the viewer image in association with the display information. The server 22A (22B) analyzes the sound and voice obtained by the microphone 24A (24B) to recognize a speaker and recognize the sound and voice. After the viewer is recognized as the result of the speaker recognition, personal information or the recognition result of the sound and voice is converted into a word or the like. The server 22A (22B) then adds a word or the like to the viewer image, and stores the image in the database 4. The server 22A (22B) may detect the presence of a viewer by detecting the operation of a keyboard or a mouse (not shown).

The camera 23A (23B) functions as an image-taking unit. The server 22A (22B) functions as a controlling unit and a reproducing unit. The sensor 26A (26B), the touch panel 27A (27B), and the server 22A (22B) function as detecting units.

Figure 2:
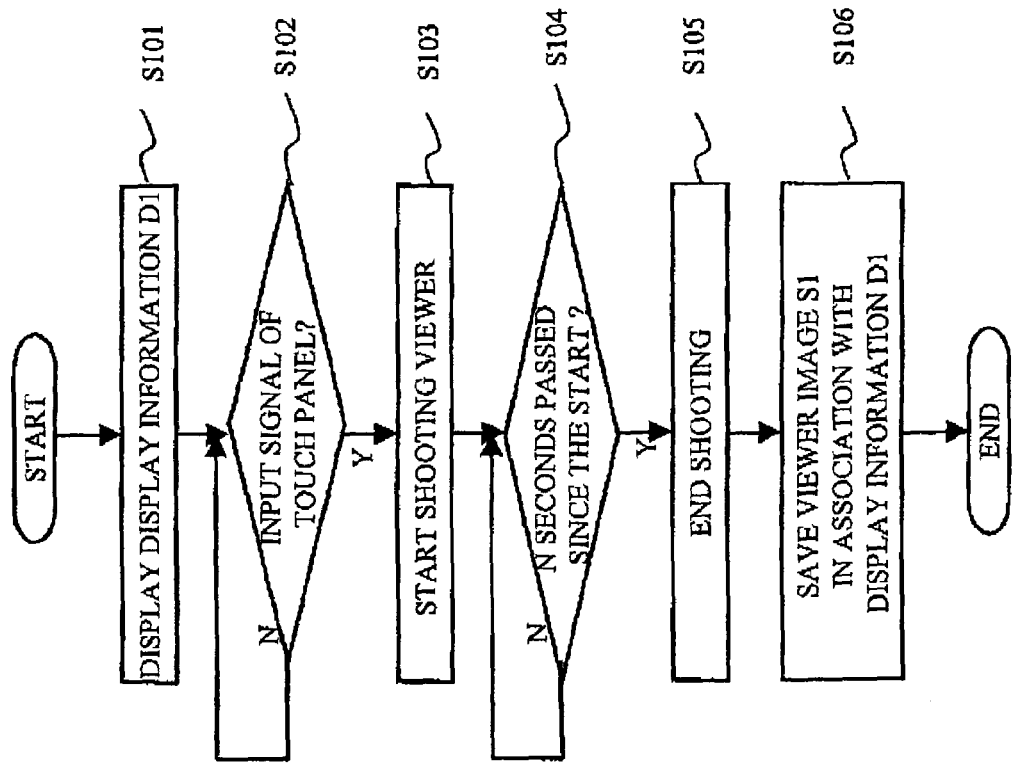
FIG. 2 is a flowchart showing a save processing of an viewer image.

Save processing of the viewer image S1 will now be described. The viewer image S1 has been captured with the communication apparatus 2A set up at the point A. FIG. 2 is a flowchart of save processing of the viewer image S1. Mr. Y who works at the point A is interested in the display information D1, and is watching the display information D1 that is being displayed on the display device 21A in the communication apparatus 2A. In step S101, the display information D1 is displayed on the display device 21A. In step S102, the server 22A judges whether the input signal has been inputted from the touch panel 27A. When Mr. Y becomes interested in the display information D1 and touches the touch panel 27A, the server 22A detects an input signal from the touch panel 27A. According to this input signal, the presence of a viewer is detected.

In step S103, the server 22A starts shooting Mr. Y, who is a viewer, with the camera 23A. Before starting shooting, a prior permission may be asked for the viewer. While an image is being taken, the image may be displayed for monitoring so that the viewer can watch the image. In step S104, the server 22A checks whether N seconds have passed since the shooting started with the camera 23A. In step S105, the shooting with the camera 23A is stopped when N seconds have passed. A user may manually start or stop shooting.

The server 22A transmits information for identifying the display information D1 that is being displayed on the display device 21A, the viewer image S1 of Mr. Y that has been captured with the camera 23A, and information associated with the viewer image, to the server 3 via the network 5. The information associated with the viewer image includes a shooting date, an ID of the display device, information on the set-up place of the display device, a content of the user's operation such as which button the user has pushed, information from the sensor 26A (26B) for detecting the viewer, distance information, the result of the identification of the viewer from the use of image processing or RFID, the result of the voice and sound analysis, and so on.

In step S106, the server 3 stores the viewer image S1 in the database 4, in association with the display information D1. This means that the viewer image S1 and the display information D1 have been associated and stored. Edit processing such as cutting may be performed on the viewer image that has been captured.

The viewer image that has been stored in the database 4 will now be described. FIG. 3 is a table showing the viewer images stored in the database 4. As shown in FIG. 3, the viewer image S1 is stored in association with the display information D1. The viewer image S2 is stored in association with the display information D2. The viewer images S3 and S4 are stored in association with the display information D3. The viewer image S5 is stored in association with the display information D4. The viewer images S11, S12, and S13 are associated with the display information D11. In addition, each of the viewer images is stored in association with data such as the time to start shooting, the time to stop shooting, the recognition result of the voice and sound, the place where a shooting has been done, the user's operation, and so on. Furthermore, the viewer image may be associated with the viewer's e-mail address, telephone number, or the like.

Figure 4:
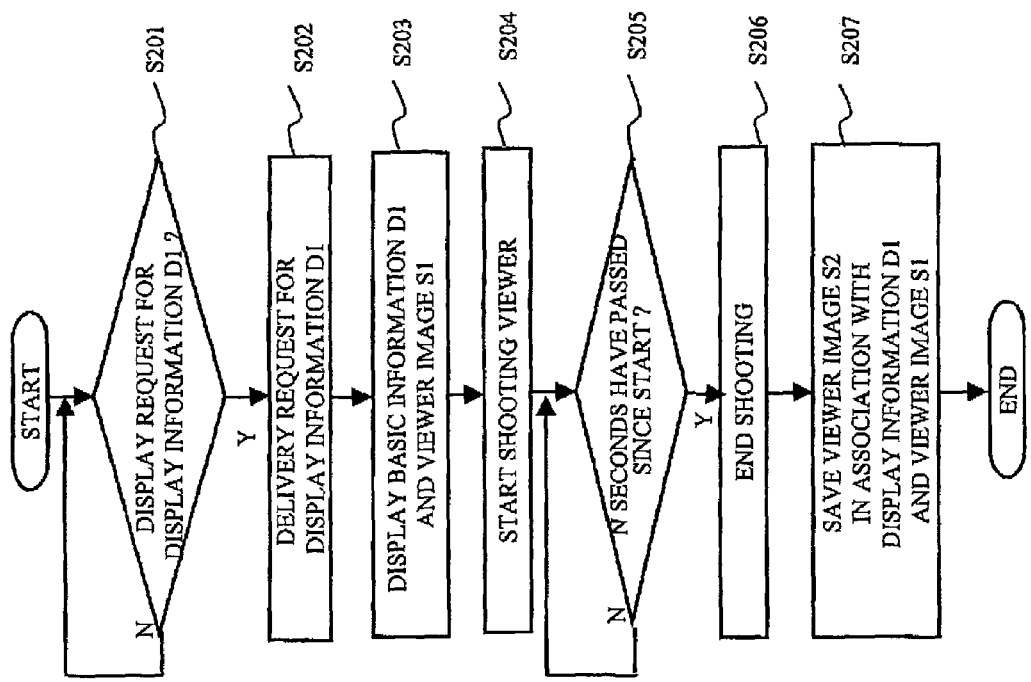
FIG. 4 is a flowchart of display processing of display information D1 and viewer image S1 on a communication apparatus 2B.

Next, display processing of the display information D1 and the viewer image S1 will now be described. The display information D1 is included in the communication apparatus 2B that is set up at the point B. FIG. 4 is a flowchart of the display processing of the display information D1 and the viewer image S1 in the communication apparatus 2B. Mr. K and Mr. J who work at the point B are going to display the display information D1 on the display device 21B in the communication apparatus 2B.

In step S201, the server 22B checks whether there is a display request for the display information D1. When one of Mr. K and Mr. J operates the touch panel 27B and sends a request for displaying the display information D1, a delivery request for the display information D1 is sent to the server 3, as shown in step S202. When the server 3 receives the delivery request for the display information D1 from the communication apparatus 2B, the server 3 searches the database 4 for the viewer image that is associated with the display information D1. The server 3 transmits the display information D1 and the viewer image S1 that is associated with the display information D1, to the communication apparatus 2B.

In step S203, when the server 22B of the communication apparatus 2B receives the display information D1 and the viewer image S1 from the server 3, the server 22B displays the display information D1 and the viewer image S1 on the display device 21B. This allows Mr. K and Mr. J to watch the viewer image S1 together with the display information D1. Mr. K and Mr. J who work at the point B are acquainted with Mr. Y; however, they are working on different projects and do not know activities of each other almost at all. Mr. K and Mr. J understand that Mr. Y was interested in the display information D1 and was watching the display information D1 with interest. Accordingly, Mr. K and Mr. J discover that the display information D1 includes important information for Mr. Y's project team, and have decided to watch the display information D1 carefully.

The display information D1 also includes helpful information for Mr. K's and Mr. J's project. Mr. K and Mr. J think that the activities of Mr. Y's project will be helpful for Mr. K's and Mr. J's activities. At a later time, taking an opportunity for talking about the display information D1, Mr. K and Mr. J planned a meeting to exchange information with Mr. Y. Mr. K, Mr. J, and Mr. Y were able to provide necessary information with each other. In this way, the reaction resulted from another viewer is able to develop into new communication.

In step S204, when the display information D1 and the viewer image S1 start to be displayed, the server 22B starts shooting Mr. K and Mr. J who are the viewers in this case, with the camera 23B. In step S205, the server 22B checks whether N seconds have passed since the shooting started with the camera 2313. In step S206, shooting of Mr. K and Mr. J with the camera 23B is stopped when N seconds have passed. The server 22A transmits the display information D1, information for identifying the viewer image S1, the viewer image S2 captured with the camera 23B, to the server 3 via a network. In step S207, the server 3 stores the viewer image S2 in association with the display information D1 and the viewer image S1, in the database 4. Accordingly, the viewer image S2 is associated with the display information D1 and the viewer image S1, and are used for the display request at a later time.

According to the first embodiment of the present invention, the viewer image is stored in association with the display information. When another viewer who has watched the viewer image is able to know the reaction of another viewer; therefore, new communication resulted from the reaction of another viewer will be expected.

Figure 5:
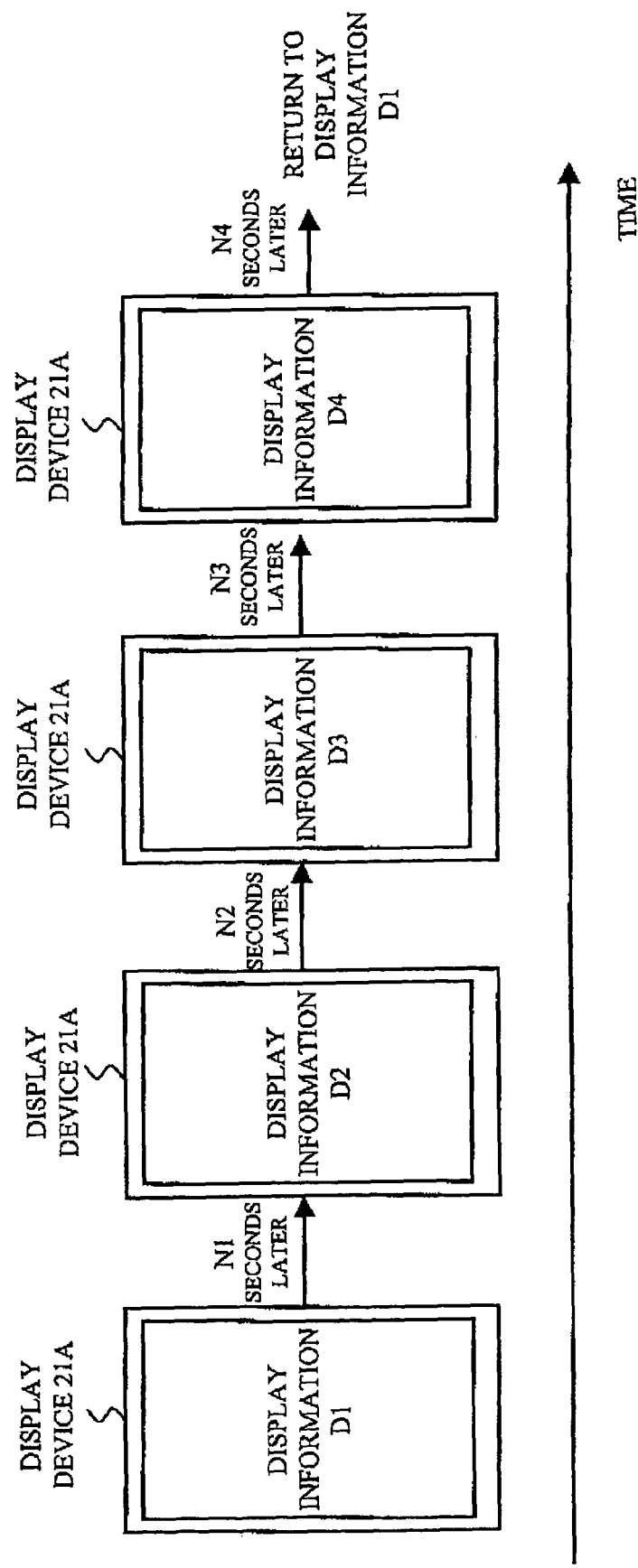
FIG. 5 illustrates a display example of display information.

Next, a second embodiment of the present invention will now be described. FIG. 5 illustrates a display example of display information. In FIG. 5, it is shown that the display information on the display device 21A. The display device 21A is included in the communication apparatus 2A. The communication apparatus 2A is set up at the point A. As shown in FIG. 5, the display device 21A displays the display information D1 at first, displays the display information D2 after N1 seconds have passed, displays the display information D3 after N2 seconds have passed, displays the display information D4 after N3 seconds have passed, and displays the display information D1 again after N4 seconds have passed. In this way, the display device 21A is controlled by the server 22A, and displays the display information after changing the display information automatically as time passes.

The database 4 retains information on what display information is displayed on the display device 21A of the communication apparatus 2A. Also, the database 4 retains information at what point each piece of display information is displayed. The server 22A accesses the server 3 to learn what display information is displayed at each point. Specifically, as shown in FIG. 5, the database 4 retains information on after N1 seconds have passed, the display information D2 is displayed, for example.

Figure 6:
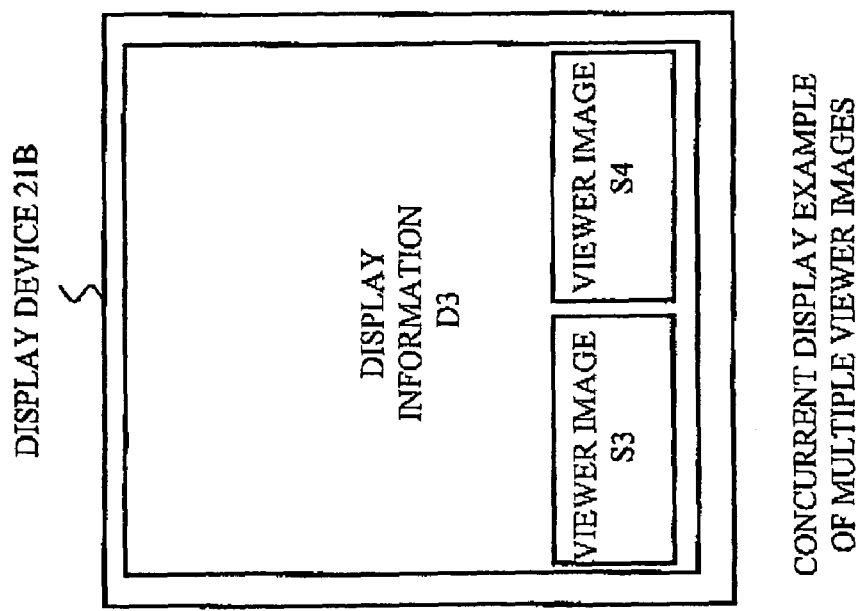
FIG. 6 illustrates a display example that displays multiple viewer images concurrently on multiple windows.

The viewer image will now be described. In particular, a display example to display multiple viewer images will be described FIG. 6 illustrates a display example that displays multiple viewer images concurrently on multiple windows. As shown in FIG. 6, the server 22B displays the display information D3 on the display device 21B, and displays the viewer images S3 and S4 concurrently on two windows. The viewer images S3 and S4 are associated with the display information D3.

Figure 7:
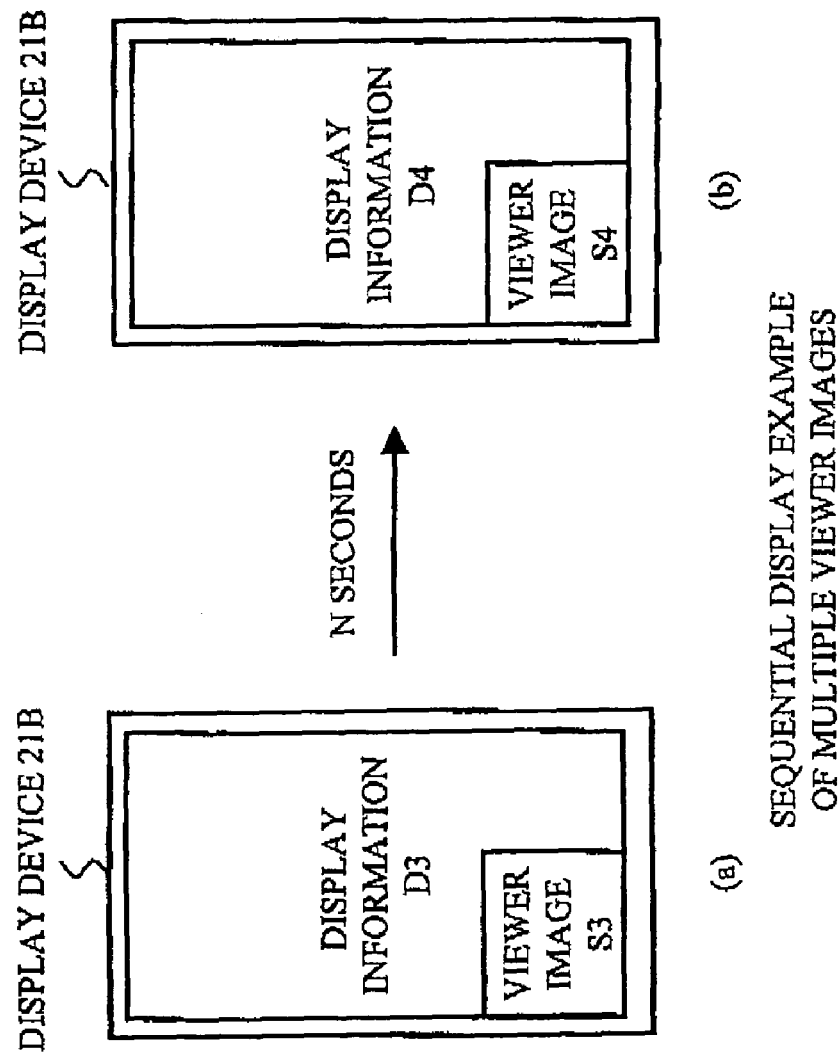
FIGS. 7A and 7B illustrate a display example that displays multiple viewer images sequentially on a window.

FIGS. 7A and 7B illustrate a display example that displays multiple viewer images sequentially on a window. The server 22B, as shown in FIG. 7A, displays the display information D3 and the viewer image S4 on the display device 21B at first. The viewer image S4 is associated with the display information D3. After N seconds have passed, as shown in FIG. 7B, the viewer image S4 is displayed. The viewer image S4 is associated with the display information D3.

Figure 8:
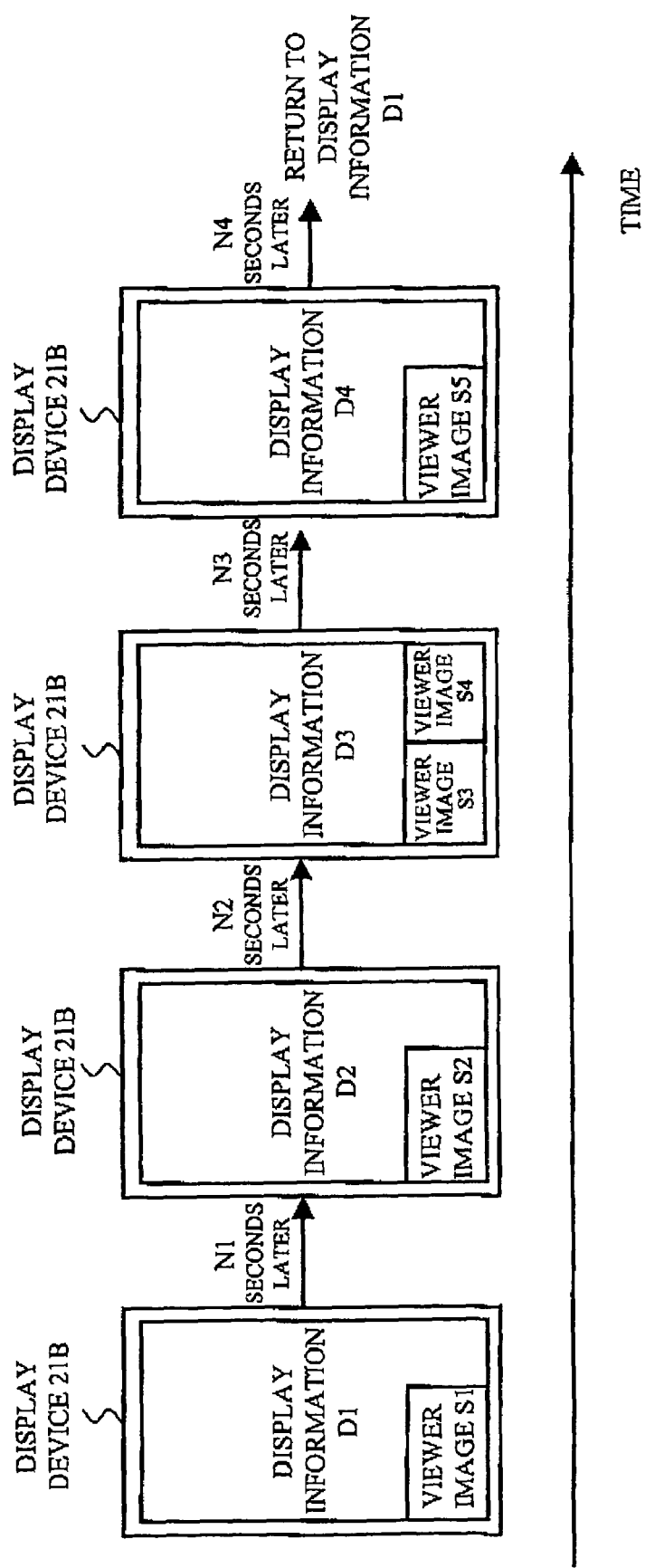
FIG. 8 illustrates a display example of the viewer images.

FIG. 8 illustrates a display example of the viewer images. In FIG. 8, it is shown that a display example on the display device 21B in the communication apparatus 2B. The communication apparatus 2B is set up at the point B. When the display information D1 through D4 is displayed on the display device 21B, database 4 is searched for the viewer images S1 through S5 that are associated with the display information D1 through D4, and then the viewer images are displayed. As shown in FIG. 8, the display device 21B displays the display information D1 and the viewer image S1 at first. The display device 21B displays the display information D2 and the viewer image S2 after N1 seconds have passed, displays the display information D3 and the viewer images S3 and S4 after N2 seconds have passed, displays the display information D4 and the viewer image S5 after N3 seconds have passed, and displays the display information D1 after N4 seconds have passed. In this way, the display device 21B is controlled by the server 22B, and displays the display information and the viewer image, which is associated with the display information, after changing the display information and the viewer image automatically as time passes.

Figure 9:
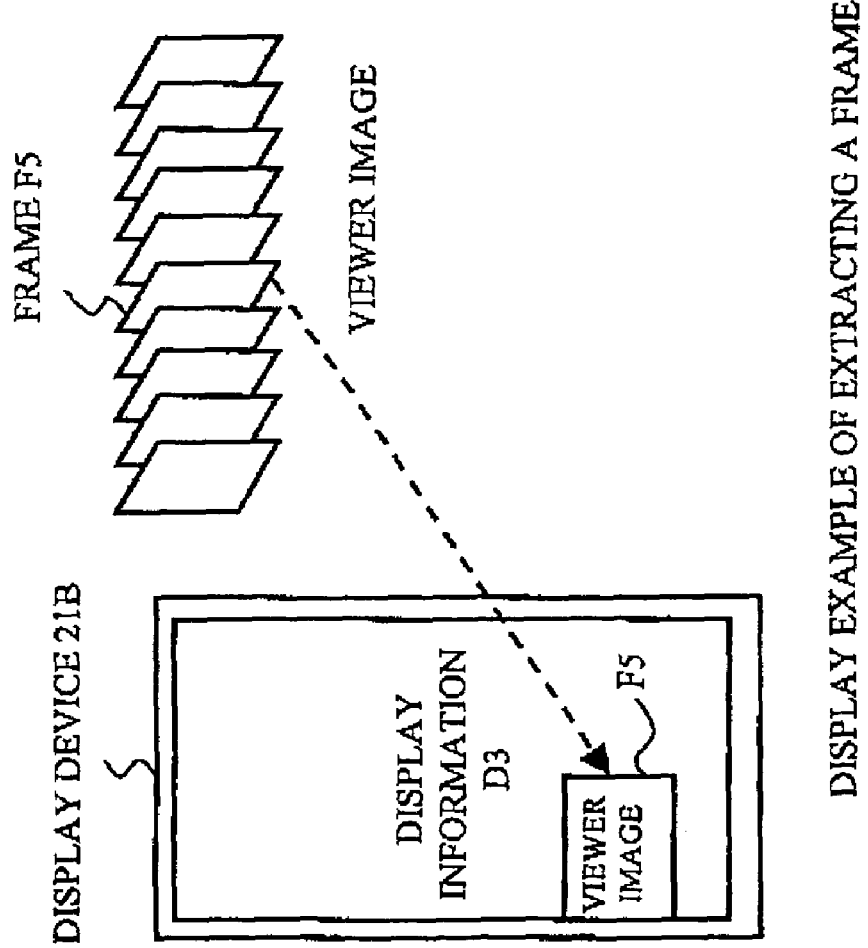
FIG. 9 illustrates a display example of the static image, and one frame is extracted from the viewer images.
Figure 10:
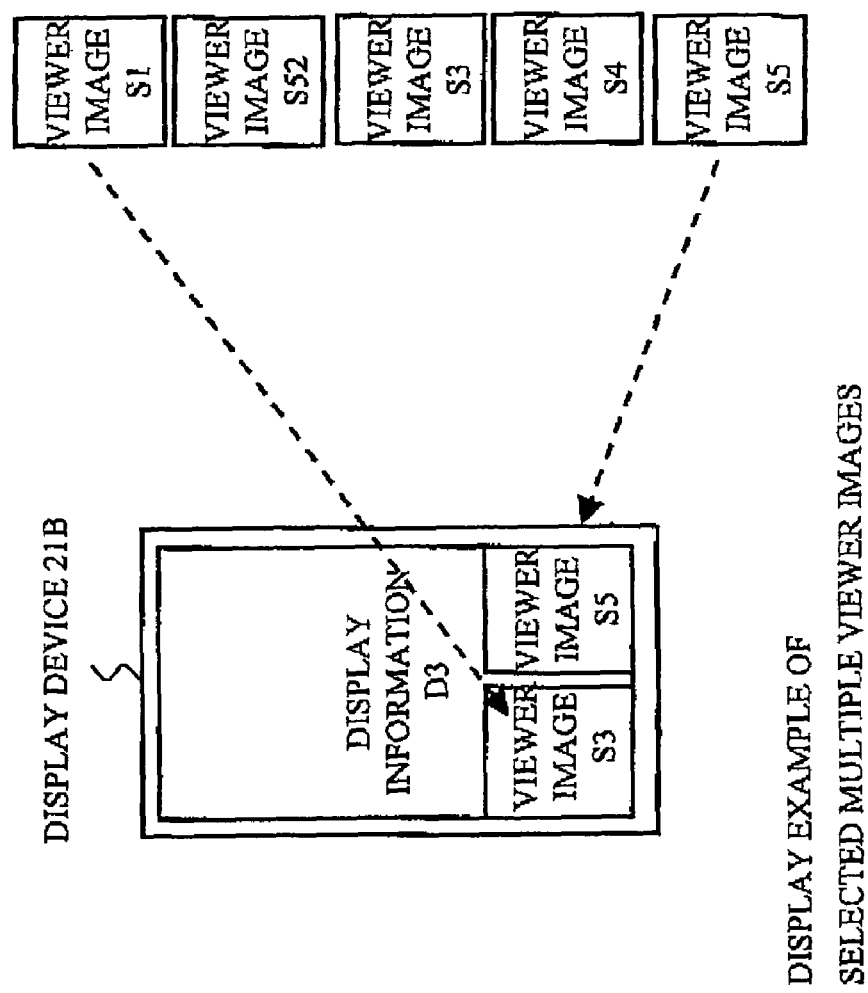
FIG. 10 illustrates a display example of only N-number images selected from multiple viewer images.

FIG. 9 illustrates a display example of the static image. One frame is extracted from the viewer images. As shown in FIG. 9, when the viewer image corresponding to the display information D3 is a moving image, the server 22B extracts only a fifth frame from the viewer image, and displays the frame on the display device 21B as a static image. FIG. 10 illustrates a display example of only N-number images selected from multiple viewer images. When there are multiple viewer images that are associated with the display information, the server 22B selects N-number images (two images in FIG. 10) from the multiple viewer images, and then displays the selected images. As shown in FIG. 10, if there are five viewer images that are associated with the display information D3, the server 22B selects two viewer images, S1 and S5, from the viewer images S1 through S5, and then displays the selected images.

In addition, only the latest M-number viewer images for each point may be displayed. M-number viewer images may be displayed in descending order of the number of people shown in the viewer image. According to the information in the database 4 or the server 22B, the above-mentioned selection rules are decided for selecting the viewer images.

Figure 11:
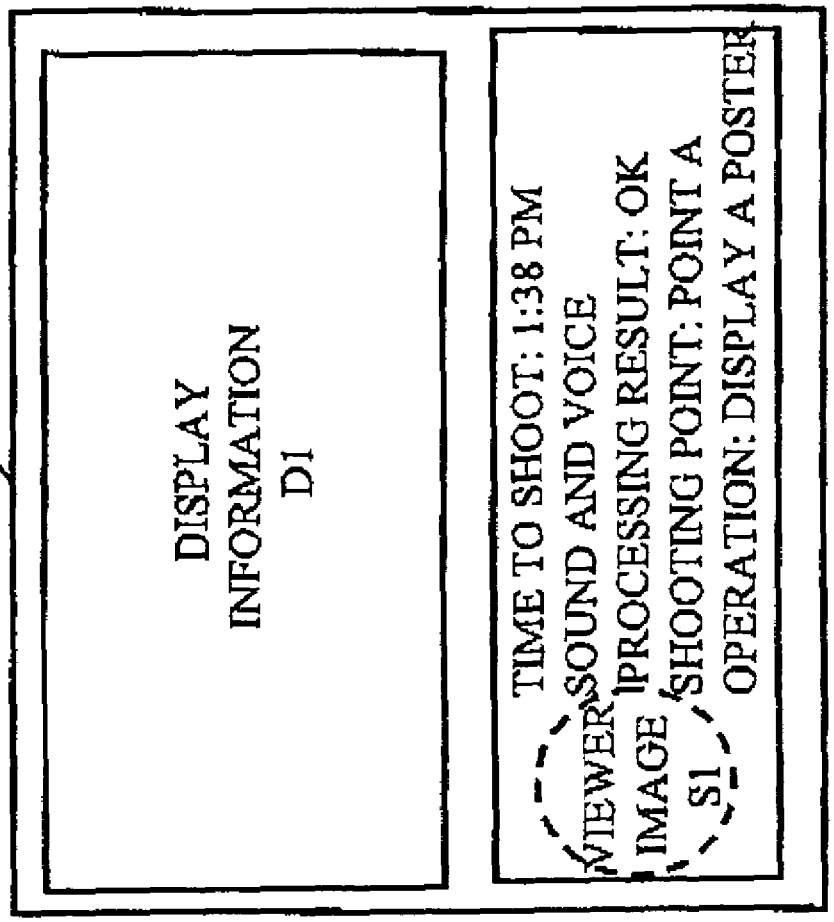
FIG. 11 illustrates a display example of characters associated with the viewer image.

FIG. 11 illustrates a display example of characters associated with the viewer image. The server 22B obtains the display information D1 together with information that is added to the display information D1, from the database 4 by way of the server 3. As shown in FIG. 11, the server 22B displays the display information D1 and the viewer image S1 on the display device 21B, and also displays the time to start shooting the viewer image: "1:38 PM", the recognition result of the voice and sound: "It's great", the place where the viewer image was captured: "Point A", and the user's operation: "Display a poster". The user's e-mail address or telephone number may be displayed, too. In FIG. 11, the information that has been added to the database 4 is described in characters as a display example; however, not only characters but also symbols may be displayed. The symbols are managed in the database 4, after corresponding to the characters in advance.

In this way, the information that has been added in the database can be displayed as characters, together with the images. As a result, it is possible to know the reactions of other viewers in detail, and thus, new communication resulted from other viewer's reactions can be developed.

Figure 12:
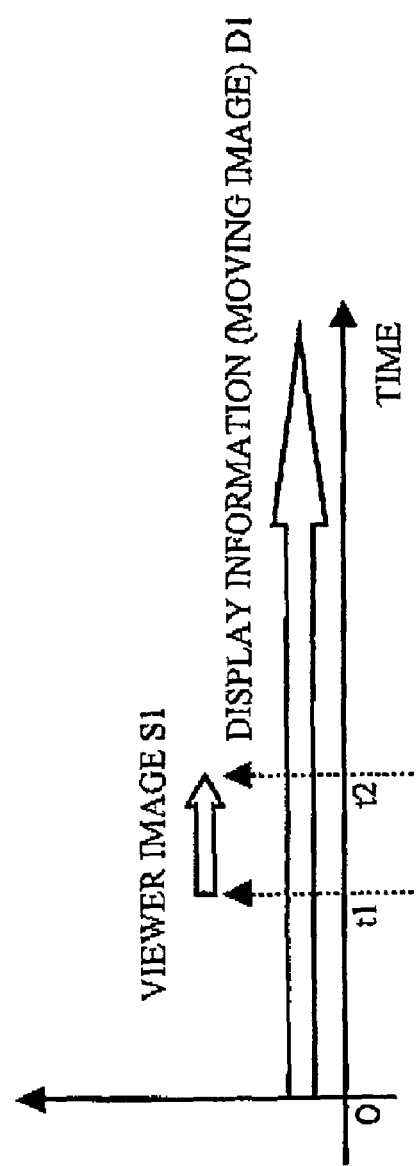
FIG. 12 illustrates a display method, in the case where the display information is a moving image.

A display method for displaying the viewer image synchronized with the display information will now be described. FIG. 12 illustrates a display method, in the case where the display information is a moving image. When the display information that is being displayed on the display device 21A is a moving image, the server 22A, which is a communication apparatus, obtains the starting time and the ending time of the viewer image, and transmits the times to the server 3. The server 3 stores the viewer image, associated display information, and the starting time and the ending time of the viewer image, in the database 4.

As shown in FIG. 12, the server 22B in the communication apparatus 2B displays the display information D1 on the display device 21B at first. The communication apparatus 2B is set up at the point B. Then, the server 22B displays the viewer image S1 on the display device 21B after t1 seconds have passed since the start of the display information D1, and ends displaying the viewer image S1 after t2 seconds have passed since the start of the display information D1. By synchronizing the display information D1 with the viewer image S1 in this way, the viewer who has watched the display information and the viewer image is able to understand the reaction of another viewer accurately.

Figure 13:
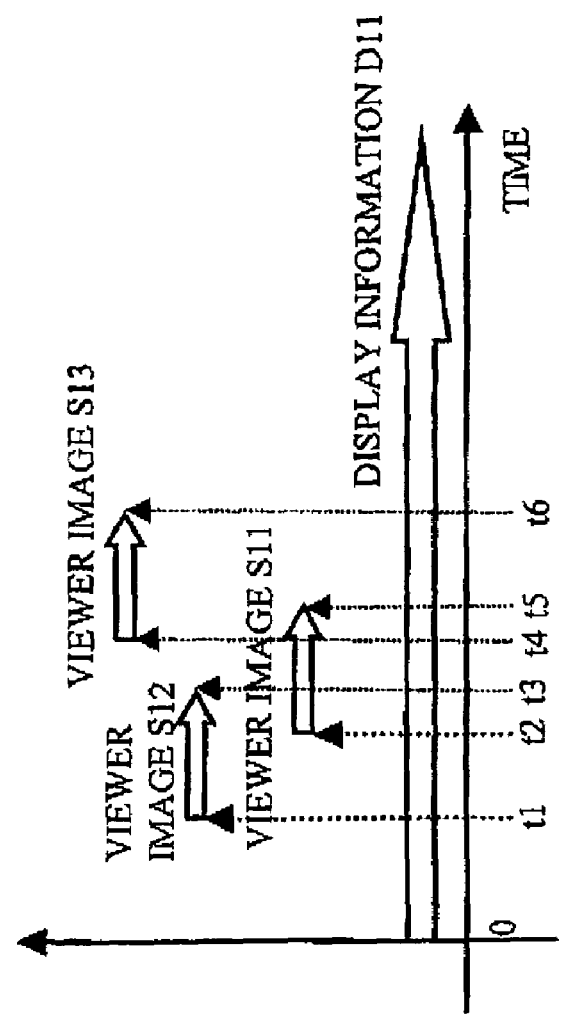
FIG. 13 illustrates a display method, in the case where the display information is a moving image and includes multiple viewer images.

Another display method, when there are multiple viewer images, will be described. FIG. 13 illustrates a display method, in the case where the display information is a moving image and includes multiple viewer images. When the communication apparatus 2B that is set up at the point B receives the display request for the display information from a viewer, the communication apparatus 2B transmits a request for sending the display information to the server 3. The server 3 searches the database 4 based on the request from the communication apparatus 2B, and then transmits the display information and the associated viewer image thereof, to the communication apparatus 2B.

When the display information is a moving image and there are multiple viewer images associated with the moving image, the server 22B in the communication apparatus 2B displays the display information D11 on the display device 21B at first. The server 22B displays the viewer image D12 from the times t1 through t3, displays D11 from the times t2 through t5, and displays D13 from the times t4 through t6. By synchronizing the multiple viewer images, which are associated with the display image, a viewer is able to understand the reaction of another viewer in detail, and thus, new communication resulted from the reaction of another viewer can be developed.

Figure 14:
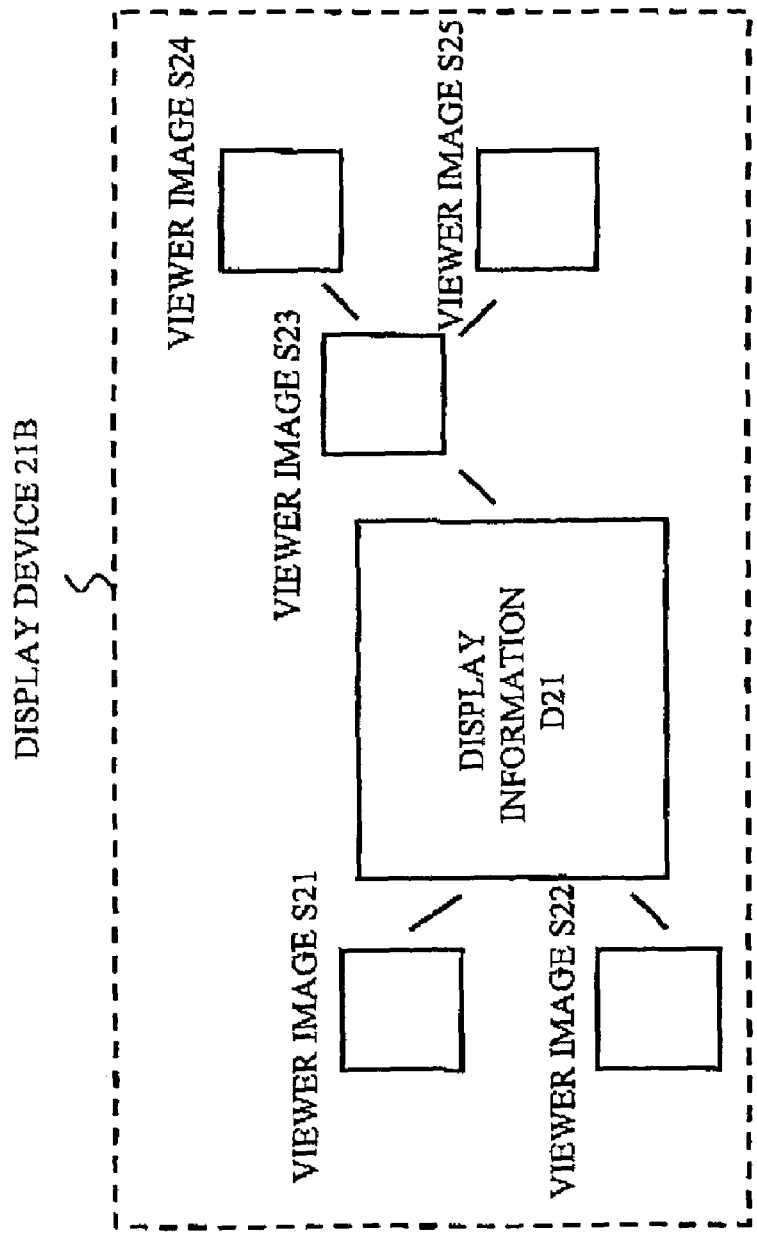
FIG. 14 illustrates visualization of the display information and the viewer image.

FIG. 14 illustrates visualization of the display information and the viewer image. When there is a viewer image that is associated with the display information obtained from the server 3, the server 22B in the communication apparatus 2B visually displays the relation between the display information and the viewer image. A viewer who has watched the visual information as shown in FIG. 14 will be able to figure out that the display information D21 is associated with the viewer images S21 through S23, and the viewer image S23 is associated with the viewer images S24 and S25.

Figure 15:
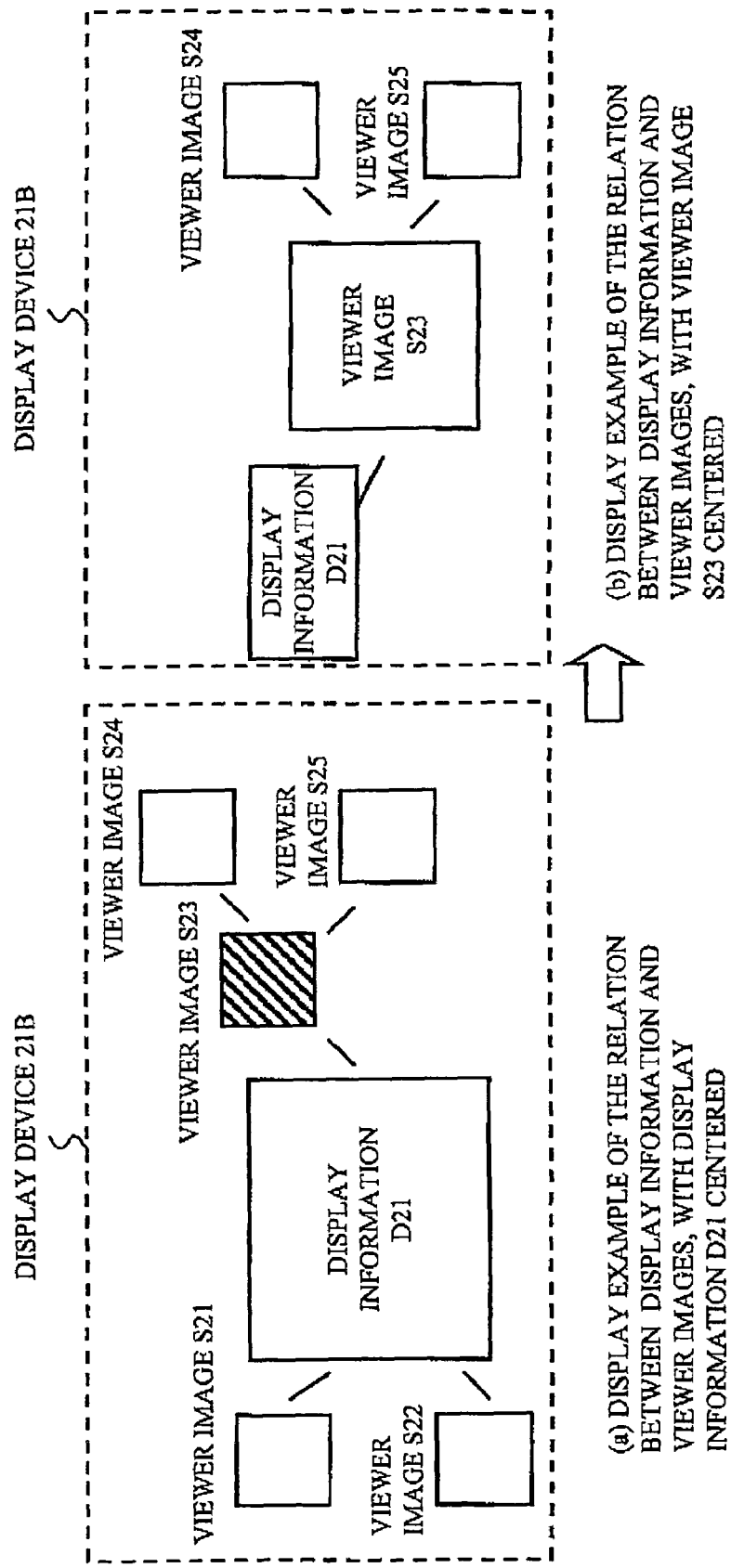
FIGS. 15A and 15B illustrate visualization of the relation between the display information and the viewer image on the basis of a specified viewer image.

Visualization of the relation between the display information and the viewer image on the basis of a specified viewer image will now be described. FIGS. 15A and 15B illustrate the visualization of the relation between the display information and the viewer image on the basis of a specified viewer image. FIG. 15A visually displays the relation between the display information and the viewer image on the basis of the display information D21. When a viewer touches the viewer image S23 displayed on the touch panel S27B, as shown in FIG. 15B, visually displayed is the relation between the display image and the viewer image, on the basis of the viewer image S23. In this way, the display information and the viewer information are displayed on the basis of the specified viewer image S23, and thus it is possible to know the reaction of another viewer resulted from the specified viewer image in detail.

So far, the display examples of the display information and the viewer image described in the second embodiment have been shown as examples. The display information and the viewer image may be displayed by using another display method.

Next, a third embodiment will now be described with reference to FIG. 16. In the third embodiment of the present invention, a conference video is used for the display information. FIG. 16 is a diagram of a system according to the third embodiment of the present invention. As shown in FIG. 16, a system 100 includes the communication apparatus 2A, the communication apparatus 2B, the server 3, and the database 4. The communication apparatus 2A is set up at the point A, and the communication apparatus 2B is set up at the point B. The communication apparatuses 2A and 2B and the server 3 are connected via a network. The communication apparatus 2A (2B) includes the display device 21A (21B), the server 22A (22B), the camera 23A (23B), the microphone 24A (24B), the speaker 25A (25B), the sensor 26A (26B), and the touch panel 27A (27B). Codes and numbers used here are identical to the first embodiment. The same codes and numbers are used for the same devices; therefore, detailed description will be omitted here.

The operation of the system 100 will now be described. Mr. Y who works at the point A operates the touch panel 27A of the communication apparatus 2A to send a display request for a conference video M1. The server 22A sends a delivery request for the conference video M1, to the server 3, based on a signal from the touch panel 27A. The server 3 searches the database 4, and delivers the conference video M1 and the viewer image associated with the conference video M1, to the server 22A. The server 22A displays the conference video M1 and the viewer images S31 through S33. As a result, Mr. Y has watched the conference video M1 and the viewer images S31 through S33 associated with M1, and then is able to know the viewer's reaction to the conference video M1.

The server 22A starts shooting Mr. Y with the camera 23A, and ends shooting after N seconds have passed since the start. The server 22A transmits the conference video M1 displayed on the display device 21A, information identifying the viewer images S31 through S33, the viewer image S34 obtained by the camera 23A, and information associated with the viewer image S34, to the server 3 via the network 5. The server 3 stores the viewer image S34 in association with the conference video M1 and the viewer images S31 through S33, in the database 4.

Mr. K and Mr. J operate the touch panel 27B of the communication apparatus 2B to send a display request for the conference video M1. The server 22B sends a delivery request for the conference video M1, to the server 3, according to a detection signal of the touch panel 27B. The server 3 searches the database 4, and transmits the conference video M1 and the viewer image associated with the conference video M1, to the server 22B. The server 22B displays the conference video M1 and the viewer images S31 through S34 associated with the conference video, on the display device 21B. Mr. K and Mr. J are able to know Mr. Y's reaction to the conference, although Mr. Y was not able to attend the conference. In addition, Mr. K and Mr. J are able to review a topic of the conference after watching Mr. Y's reaction.

According to the third embodiment of the present invention, the conference video and the viewer image are displayed. The viewer image includes the viewer who watches and listens to the conference. By knowing the viewer's reaction to the conference, it is possible to review a topic of the conference, even if the viewer here was not able to attend the conference in real time.

Figure 17:
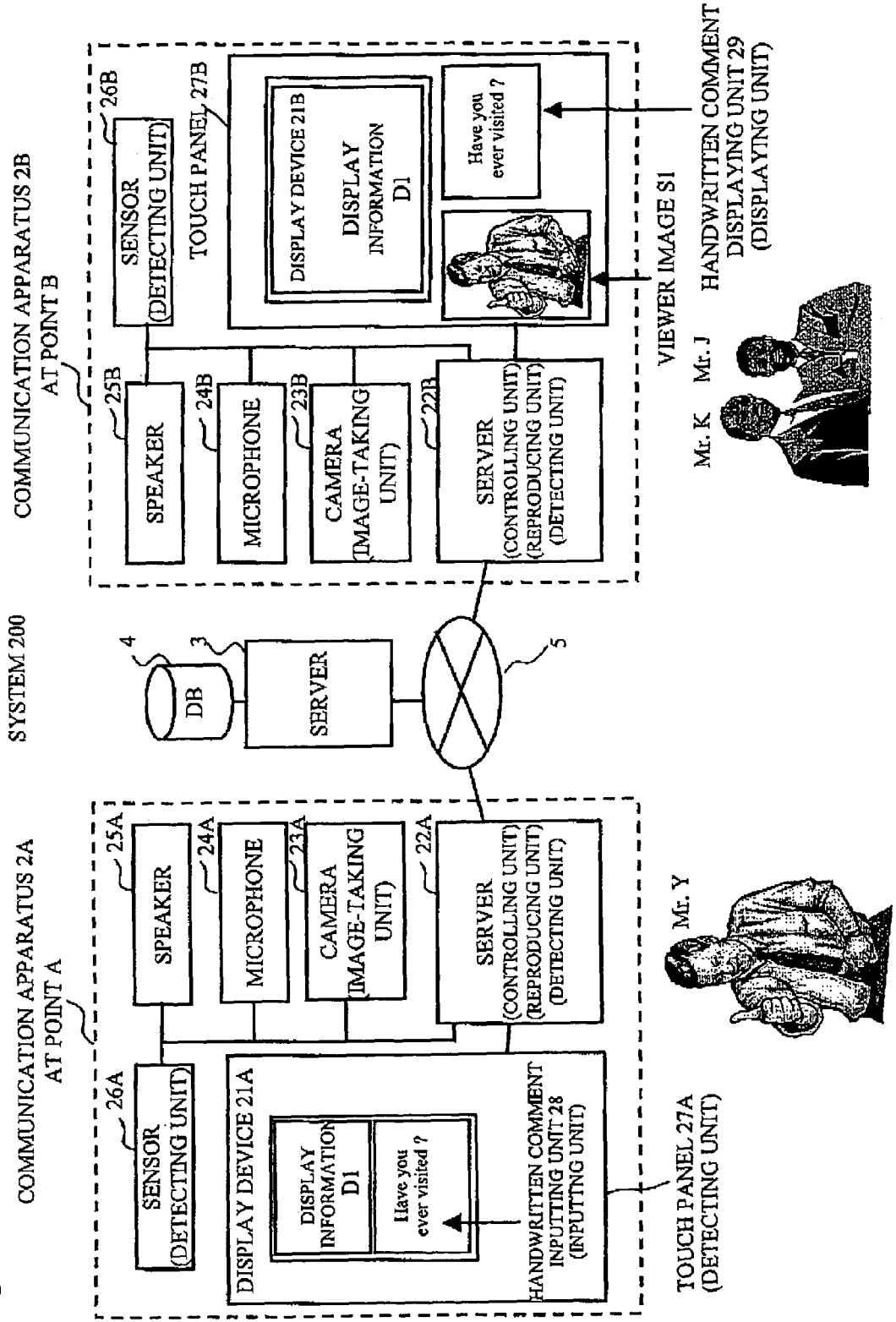
FIG. 17 is a diagram of a system according to a forth embodiment of the present invention.

A forth embodiment of the present invention will now be described. FIG. 17 is a diagram of a system according to the forth embodiment of the present invention. As shown in FIG. 17, a system 200 includes a communication apparatus 202A, a communication apparatus 202B, the server 3, and the database 4. The communication apparatus 202A is set up at the point A, and the communication apparatus 202B is set up at the point B. The communication apparatuses 202A and 202B and the server 3 are connected via a network.

The communication apparatus 202A (202B) has the display device 21A (21B), the server 22A (22B), the camera 23A (23B), the microphone 24A (24B), the speaker 25A (25B), the sensor 26A (26B), and the touch panel 27A (27B). The display device 21A in the communication apparatus 202A includes a handwritten comment inputting unit 28 in the area of the touch panel 27A.

The handwritten comment inputting unit 28 is used for inputting a comment that can be associated with a viewer image. The display device 21B in the communication apparatus 202B includes a handwritten comment displaying unit 29. Codes and numbers used here are identical to the first embodiment. The same codes and numbers are used for the same devices; therefore, detailed description will be omitted here. The handwritten comment inputting unit 28 corresponds to an inputting unit. The handwritten comment displaying unit 29 corresponds to a displaying unit.

The operation of the system 200 will now be described. Mr. Y who works at the point A operates the touch panel 27A in the communication apparatus 202A to send a display request for the display image D1. The server 22A sends a delivery request for the display image D1, to the server 3, based on a signal from the touch panel 27A. The server 3 searches the database 4. If there are the display image D1 and the viewer image associated with the display image D1, the server 3 delivers the display image D1 and the viewer image to the server 22A. If not, the server 22A displays the display information D1 on the display device 21A. The server 22A starts shooting Mr. Y with the camera 23A, and ends shooting with the camera 23A, after N seconds have passed since the start.

Mr. Y who has watched the display information D1 is able to write a comment into the handwritten comment inputting unit 28, as necessary. The sever 22A transmits the viewer image captured by the camera 23A, information identifying the display information D1 that has been displayed on the display device 21A, and the handwritten comment, to the server 3, via the network 5. The server 3 stores viewer image in association with the display information D1, in the database 4. The server 3 also stores the handwritten comment associated with the viewer image, in the database 4.

Mr. K and Mr. J, who work at the point B, operate the touch panel 27B of the communication apparatus 202B to send a display request for the display information D1. The server 223 sends a delivery request for the display information D1, to the server 3, according to a detection signal of the touch panel 27B. The server 3 searches the database 4, and transmits the display information D1, the viewer image associated with the display information D1, and the handwritten comment associated with the viewer image, to the server 22B.

The server 22B displays the display information D1 and the viewer image S1 associated with the display information D1, on the display device 21B. And then, if there is the handwritten comment associated with the viewer image, the server 22B displays the handwritten comment on the handwritten comment displaying device 29. Mr. K and Mr. J have watched the viewer image S1 associated with the display information D1 and the handwritten comment, and are able to know Mr. Y's reaction to the display information D1. Thus, new communication resulted from Mr. Y's reaction can be expected.

In each of the above-mentioned embodiments, what can be shared is who and how watches and listens to a certain piece of information, beyond distance or time. By knowing how another viewer watches the information, it becomes possible to set up a criterion of judgment whether the information is worth watching. And thus, new communication with another viewer can be started.

Figure 18:
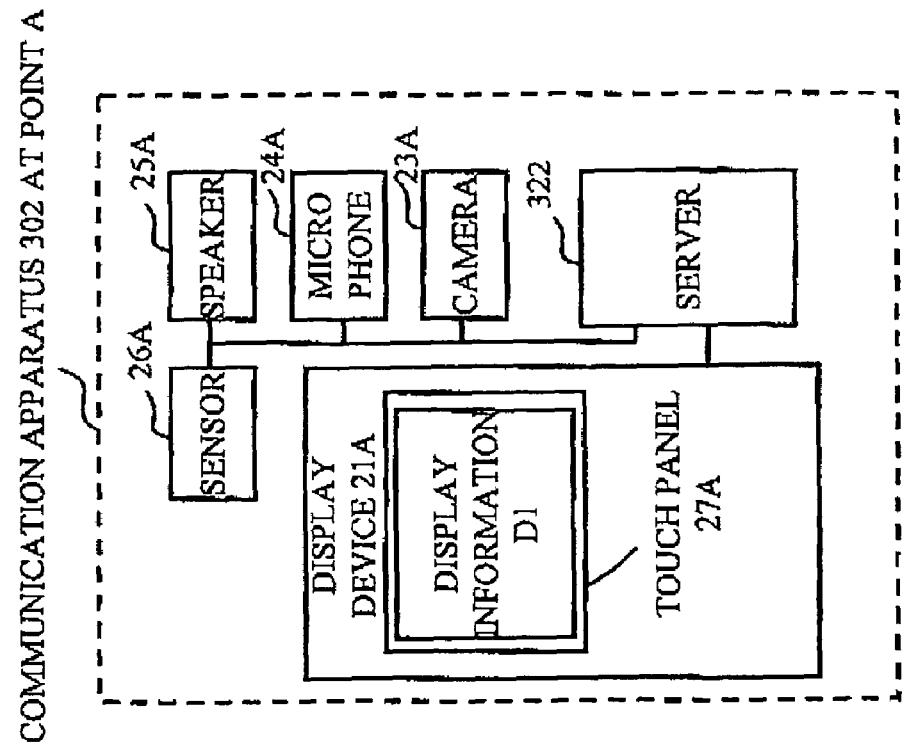
FIG. 18 is a block diagram of a communication apparatus according to a fifth embodiment of the present invention.

A fifth embodiment will now be described. FIG. 18 is a block diagram of a communication apparatus according to the fifth embodiment of the present invention. The overall system structure is same as FIG. 1, therefore, in FIG. 18, only the communication apparatus is shown. A communication apparatus 302 has the display device 21A, a server 322, the camera 23A, the microphone 24A, the speaker 25A, the sensor 26A, and the touch panel 27A. The same codes and numbers are used for the same devices as the first embodiment; therefore, detailed description will be omitted here.

Figure 19:
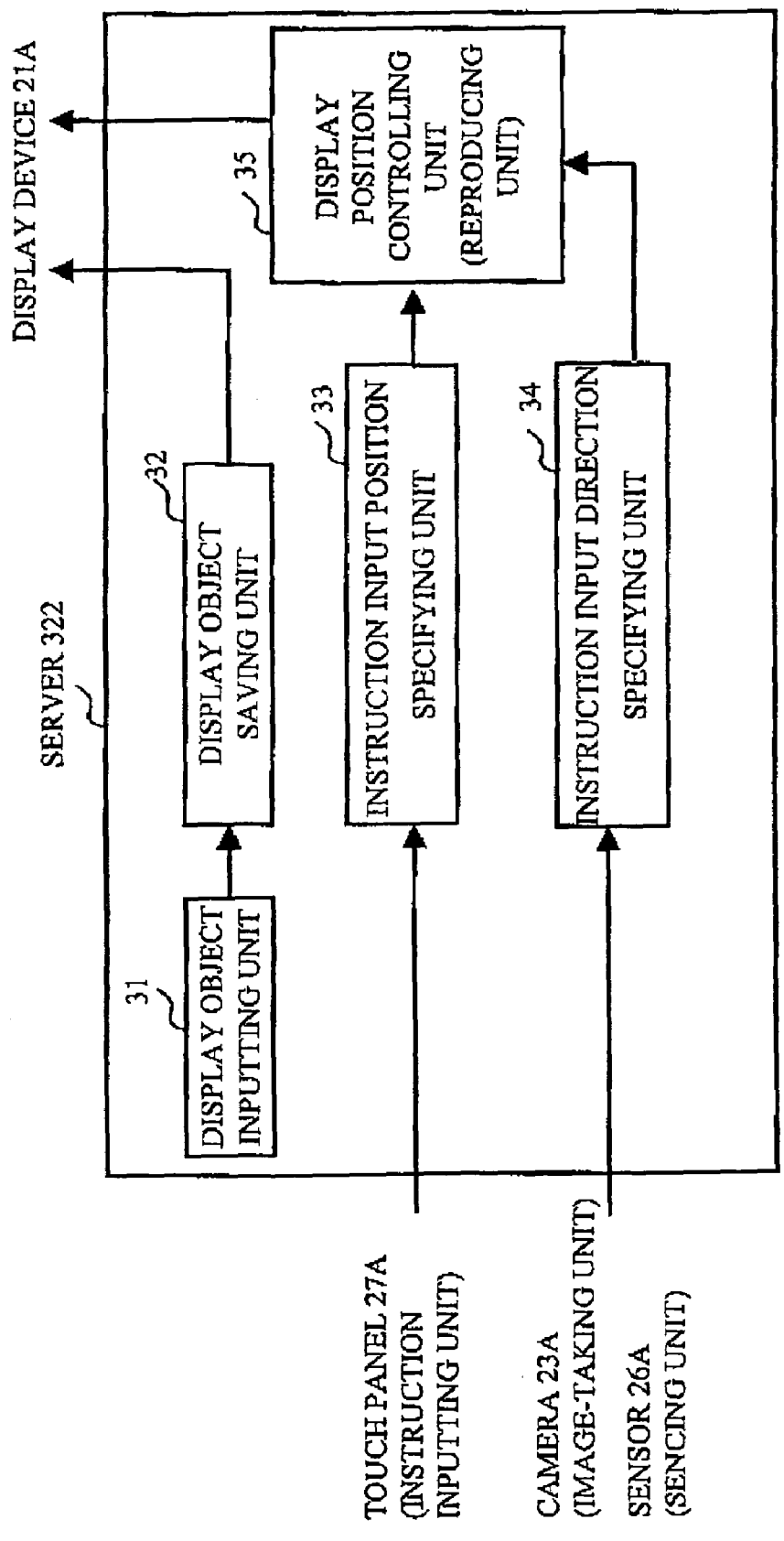
FIG. 19 is a functional block diagram of a server.
Figure 20:
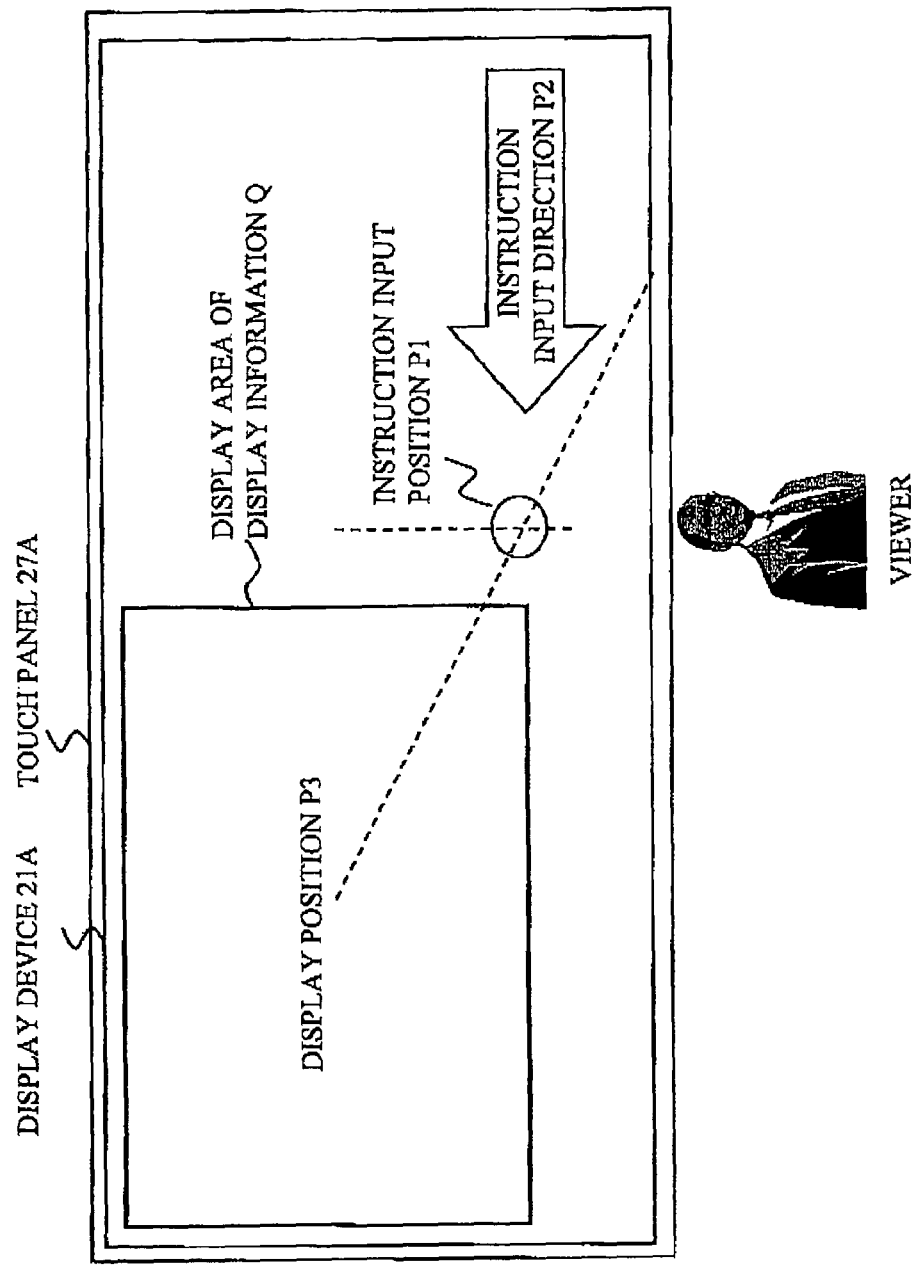
FIG. 20 is a top view showing a display position on the plane surface of a touch panel.

FIG. 19 is a functional block diagram of the server 322. FIG. 20 is a top view showing a display position on the plane surface of a touch panel. Referring to FIG. 20, 21A is the display device, 27A is the touch panel, P1 is an instruction input position from a viewer, the direction of an arrow of P2 is an instruction input direction from a viewer, P3 is the display position of the display information, and Q is a display area of the display information. On this display device 21, the display information can be displayed on the entire display device; however, in order to prevent a part of a viewer's body from covering an object to be displayed, the server 322 will include following components.

As shown in FIG. 19, the server 322 has a display object inputting unit 31, a display object saving unit 32, an instruction input position specifying unit 33, an instruction input direction specifying unit 34, and a display position controlling unit 35. The display object inputting unit 31 includes a CPU, a memory and the like. Data to be displayed such as audio-visual data or character data is inputted, and then the inputted data to be displayed is outputted to the display object saving unit 32.

The display object saving unit 32 includes a memory, a hard disk, and the like. The display object saving unit 32 retains the data to be displayed, which has been inputted from the display object inputting unit 31, and outputs the retained data to be displayed on the display device 21A. The display device 21A displays the data to be displayed, which has been inputted from the display object saving unit 32, according to the control of the display position controlling unit 35. The data to be displayed corresponds to the display information. The touch panel 27A functions as an instruction inputting unit. The touch panel 27A receives instruction inputting data from a viewer, and outputs the instruction inputting data to the instruction input position specifying unit 36.

The camera 23 shoots a viewer who is standing in front of the communication apparatus 302, and outputs the obtained viewer image to the instruction input direction specifying unit 34. The sensor 26A may be used instead of the camera 23A. The instruction input position specifying unit 33 includes a CPU, a memory, and the like. The instruction input position specifying unit 33 processes the instruction input data that has been inputted from the touch panel 27A, specifies the instruction input position from the viewer, and outputs the specified instruction input position data to the display position controlling unit 35.

The instruction input direction specifying unit 34 includes a CPU, a memory, and the like. The instruction input direction specifying unit 34 processes audio-visual data which has been inputted from the camera 23A, specifies the instruction input direction P2 of the viewer, and outputs the specified instruction input direction data to the display position controlling unit 35. When the sensor 26A is used instead of the camera 23A, the instruction input direction specifying unit 34 specifies the instruction input direction, based on the sensor information that has been inputted from the sensor 26A.

The display position controlling unit 35 includes a CPU, a memory, and the like. The display position controlling unit 35 processes the instruction input position data and instruction input direction data. The instruction input position data has been inputted from the instruction input position specifying unit 36. The instruction input direction data has been inputted from the instruction input direction specifying unit 34. Then, the display position controlling unit 35 specifies the display position in order to prevent a part of a viewer's body from covering the data to be displayed, and displays the data to be displayed which is retained in the display object saving unit 32, on the display device 21A, according to the specified display position.

As shown in FIG. 20, the display position controlling unit 35, centering the coordinate that represents the instruction input position P1, on the plat surface of the touch panel 27A, specifies the display position or the display area so that a point symmetry of the instruction input direction P2 may become the display position P3. When the instruction input position P1 and the instruction input direction P2 are inputted, the display position controlling unit 35 specifies the display position P3 on the display device 21A, for a position that is an opposite direction of the instruction input direction P2, with the instruction input position P1 centered.

According to the fifth embodiment, the instruction input position and the instruction input direction from the viewer are specified, and according to the instruction input position and the instruction input direction from the viewer, the object to be displayed is displayed; therefore, the object to be displayed can be displayed well without a part of the viewer's body covering the object to be displayed.

In carrying out the present invention, the communication apparatus of the present invention, in an aspect of the present invention, has a display device that displays display information, an image-taking unit that takes a viewer who is watching and listening to the display information, a controlling unit that saves on a viewer image on a storage device, the viewer image having been taken with the image-taking unit and being saved in association with the display information, and a reproducing unit that reproduces the viewer image in association with the display information. According to the above-mentioned aspect, the viewer image may be reproduced in association with the display information; therefore, another viewer who has watched the viewer image is able to know the reactions of other viewers, and thus, new communication resulted from the reactions of others may be expected.

The communication apparatus of the present invention, in another aspect of the present invention, has a receiving unit that receives a viewer image of a viewer from a storage device, the viewer having watched and listened to display information, and a reproducing unit that reproduces the viewer image in association with the display information. According to the above-mentioned aspect, the viewer image saved on the storage device may be transmitted, received, and then the viewer image is reproduced in association with the display information; therefore, the reaction of another viewer are learned, and thus new communication resulted from the reactions of others may be expected.

On the communication apparatus in the above-mentioned aspect, when the reproducing unit reproduces the viewer image, the display information may be reproduced so that the reaction of the viewer may be learned well.

The communication apparatus in the above-mentioned aspect, further includes a detecting unit that detects the presence of the viewer. Detection of the viewer who is watching the display information starts capturing the image of the viewer.

On the communication apparatus in the above-mentioned aspect, the detecting unit is a touch panel. When the viewer touched the touch panel, the presence of the viewer is detected, and then the image-taking unit starts shooting the viewer.

On the communication apparatus in the above-mentioned aspect, the detecting unit detects the presence of the viewer based on an image in which the viewer has been taken. The presence of the viewer may be detected based on the image in which the viewer has been taken, and thus the presence of the viewer can be detected easily. Based on the detection result, the image-taking unit starts shooting the viewer.

On the communication apparatus in the above-mentioned aspect, the detecting unit detects the presence of the viewer based on a voice of the viewer. The presence of the viewer may be detected based on the voice of the viewer; therefore, based on the detection result, the image-taking unit starts shooting the viewer.

The communication apparatus in the above-mentioned aspect further includes an input unit that a comment is inputted so as to associate the comment with the viewer image. New communication can be expected by displaying the display information together with the comment that is associated with the viewer image.

The communication apparatus in the above-mentioned aspect, further includes a comment display unit that displays the comment. New communication can be expected by displaying the comment, when displaying the viewer image.

On the communication apparatus in the above-mentioned aspect, the reproducing unit displays multiple viewer images concurrently on multiple windows. And thereby, another viewer who is watching the viewer images is able to learn the responses of other viewers at the same time.

On the communication apparatus in the above-mentioned aspect, the reproducing unit displays multiple viewer images sequentially on a window. And thereby, another viewer who is watching the viewer images is able to learn the reactions of other viewers sequentially.

On the communication apparatus in the above-mentioned aspect, the reproducing unit displays a character or a symbol that is associated with the viewer image. And thereby, new communication can be developed.

On the communication apparatus in the above-mentioned aspect, the reproducing unit displays the viewer image in synchronization with the display information. And thereby, another viewer who is watching the viewer image is able to learn the reaction of another viewer precisely.

On the communication apparatus in the above-mentioned aspect, the reproducing unit visually displays the relation between the display information and the viewer image. And thereby, the viewer who is watching the visual display is able to learn the relation between the display information and the viewer image.

The communication apparatus in the above-mentioned aspect, further includes an instruction input unit the receives instruction input data of the viewer, an instruction input position specifying unit that specifies an instruction input position of the viewer based on the instruction input data, and an instruction input direction specifying unit that specifies an instruction input direction of the viewer. The reproducing unit adjusts a display position on the display device based on the instruction input position of the viewer and the instruction input direction of the viewer. According to the instruction input position and the instruction input direction of the viewer, the object to be displayed is displayed to the viewer. And thereby, a part of the viewer's body from covering the object to be displayed can be prevented so that the object to be display can be displayed well.

The communication apparatus of the present invention, in another aspect of the present invention, has a display device that displays information, an instruction input unit that receives instruction input data of the viewer who watches and listens to the display information, an instruction input position specifying unit that specifies an instruction input position of the viewer based on the instruction input data, an instruction input direction specifying unit that specifies an instruction input direction of the viewer, and a reproducing unit that adjusts the display position on the display device, based on the instruction input position of the viewer and the instruction input direction of the viewer. According to the above-mentioned aspect, the object to be displayed can be displayed well, according to the instruction input position and the instruction input direction of the viewer, and thereby, a part of the viewer's body from covering the object to be displayed can be prevented so that the object to be display can be displayed well.

On the communication apparatus in the above-mentioned aspect, the instruction input unit specifies the instruction input direction of the viewer, based on an image in which the viewer has been taken with the image-taking unit. According to the above-mentioned aspect, the instruction input direction of the viewer can be specified based on the image that the image-taking unit has captured.

On the communication apparatus in the above-mentioned aspect, the instruction input unit specifies the instruction input direction of the viewer, based on sensor information from a sensor. According to the above-mentioned aspect, the instruction input direction of the viewer can be specified based on the sensor information from the sensor.

A system having multiple communication apparatuses that are connected via a network, on the communication apparatus in the above-mentioned aspect. The viewer image is stored in association with the display information, the viewer image is transmitted according to a request from the outside, the viewer image is received by the communication apparatus, and then the viewer image may be reproduced in association with the display information. Thus, what can be provided is the system that may develop new communication resulted from the reactions of others.

A display method, in another aspect of the present invention, has the steps of taking a viewer image of a first viewer who is watching and listening to first display information that is displayed on a first display device, saving on a storage device, the viewer image of the first viewer, in association with the display information, and reproducing the viewer image of the first viewer in association the display information. In the above-mentioned aspect, the first viewer image is reproduced in association with the first display information, and thereby a person who has watched the first viewer image is able to learn the reaction of the viewer, and thus new communication resulted from the reactions of others can be developed.

The display method, in another aspect of the present invention, further has the steps of taking a viewer image of a second viewer who is watching and listening to the display information and the viewer image of the first viewer that are being displayed on a second display device, saving on the storage device, the viewer image of the second viewer in association with the viewer image of the first viewer, and displaying on a second display device, the viewer image of the first viewer and the viewer image of the second viewer. In the above-mentioned aspect, by displaying the image of the first viewer who is watching the first display information, the second viewer, who is watching the viewer image of the first viewer, is able to grasp various reactions of the first viewer, and thus new communication can be developed.

The display method in the above-mentioned aspect, further includes the step of detecting the presence of at least one of the first viewer and the second viewer. And thereby, the presence of the viewer who is watching the display information is detected so that the viewer image may be taken.

The display method, in another aspect of the present invention, further has the step of visually displaying the relation between the display information and the viewer image. In the above-mentioned aspect, by visually displaying the relation between the display information and viewer image, a person who is watching the visual display is able to grasp the relation between the display information and the viewer image.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2004-040400 filed on Feb. 17, 2004 including specification, claims, drawings, and abstract is incorporated herein by reference in its entirety.

What is claimed is:

1. A communication apparatus comprising:
    a display device that outputs display information;
    an image-taking unit that takes a viewer image of a viewer who is at least one of watching and listening to the display information;
    a controlling unit that determines whether a face direction of the viewer in the viewer image is a direction looking at the display device, and saves the viewer image and the display information on a storage device based on a result of the determination, the viewer image and the display information associated with each other on the storage device; and
    a reproducing unit that outputs an image of a viewer along with display information that is associated with the image.

2. A communication apparatus comprising:
    a receiving unit that receives an image of a viewer from a storage device, the viewer having at least one of watched and listened to display information that is output on a display unit, and the image being saved in association with the display information on the storage device in response to a determination of whether a face direction of the viewer in the image of the viewer is a direction looking at the display unit; and
    a reproducing unit that outputs the image along with the display information.

3. The communication apparatus as claimed in claim 1, wherein the display information is reproduced, when the reproducing unit outputs the viewer image.

4. The communication apparatus as claimed in claim 1, further comprising a detecting unit that detects the presence of the viewer.

5. The communication apparatus as claimed in claim 4, wherein the detecting unit is a touch panel.

6. The communication apparatus as claimed in claim 4, wherein the detecting unit detects the presence of the viewer, based on the viewer image.

7. The communication apparatus as claimed in claim 4, wherein the detecting unit detects the presence of the viewer, based on a voice of the viewer.

8. The communication apparatus as claimed in claim 1, further comprising an input unit that a comment is inputted to associate the comment with the viewer image.

9. The communication apparatus as claimed in claim 8, further comprising a comment display unit that displays the comment.

10. The communication apparatus as claimed in claim 1, wherein the reproducing unit displays a plurality of viewer images concurrently on a plurality of windows.

11. The communication apparatus as claimed in claim 10, wherein the reproducing unit displays the plurality of viewer images sequentially on a window.

12. The communication apparatus as claimed in claim 1, wherein the reproducing unit displays a character or a symbol that is associated with the viewer image.

13. The communication apparatus as claimed in claim 1, wherein the reproducing unit displays the viewer image in synchronization with the display information.

14. The communication apparatus as claimed in claim 1, wherein the reproducing unit visually displays the relation between the display information and the viewer image.

15. The communication apparatus as claimed in claim 1 further comprising:
   an instruction input unit that receives input from the viewer;
   an instruction input position specifying unit that specifies a position on the display device at which the viewer enters the input; and
   an instruction input direction specifying unit that specifies a direction from which the viewer enters the input,
   wherein the reproducing unit adjusts a position of the display information on the display device based on the position on the display device at which the viewer enters the input and the direction from which the viewer enters the input.

16. A communication apparatus comprising:
   a display device that outputs information;
   an instruction input unit that receives input from a viewer who has at least one of watched and listened to the information;
   an instruction input position specifying unit that specifies a position on the display device at which the viewer enters the input;
   an instruction input direction specifying unit that specifies a direction from which the viewer enters the input; and
   a reproducing unit that adjusts a position of the information output on the display device based on the position on the display device at which the viewer enters the input and the direction from which the viewer enters the input.

17. The communication apparatus as claimed in claim 16, wherein the instruction input unit specifies the instruction input direction of the viewer, based on an image in which the viewer has been taken with an image-taking unit.

18. The communication apparatus as claimed in claim 16, wherein the instruction input unit specifies the instruction input direction of the viewer, based on sensor information from a sensor.

19. A system having a plurality of communication apparatuses that are connected via a network, wherein the communication apparatus is as claimed in claim 1.

20. A system having a plurality of communication apparatuses that are connected via a network, wherein the communication apparatus is as claimed in claim 16.

21. A display method comprising:
   by an image obtaining device, obtaining a viewer image of a first viewer who is at least one of watching and listening to first display information that is displayed on a first display device;
   saving the viewer image of the first viewer on a storage device if a face direction of the first viewer is a direction looking at the first display device, the viewer image of the first viewer and the first display information associated with each other on the storage device; and
   reproducing the viewer image of the first viewer along with the first display information.

22. The display method as claimed in claim 21, flirt her comprising:
   taking a viewer image of a second viewer who is at least one of watching and listening to second display information being displayed on a second display device the second display information comprising the viewer image of the first viewer and the first display information;
   saving the viewer image of the second viewer on the storage device, the viewer image of the second viewer and the viewer image of the first viewer associated with each other on the storage device; and
   displaying the viewer image of the second viewer on a third display device.

23. The display method as claimed in claim 22, further comprising, detecting the presence of at least one of the first viewer and the second viewer.

24. The display method as claimed in claim 21, further comprising, visually displaying the relation between the display information and the viewer image of the first viewer.

25. A communication apparatus comprising:
   an image-taking unit that takes an image of a viewer who is at least one of watching and listening to information that is output on a display device;
   a controlling unit that determines whether the face direction of the viewer is a direction looking at the display device, and saves the image on a storage device based on a result of the determination, the image and the display information associated with each other on the storage device; and
   a reproducing unit that outputs the image along with the information.

26. The communication apparatus as claimed in claim 2, wherein the reproducing unit displays a plurality of viewer images concurrently on a plurality of windows.

27. The communication apparatus as claimed in claim 26, wherein the reproducing unit displays the plurality of viewer images sequentially on a window.

28. The communication apparatus as claimed in claim 2, wherein the reproducing unit displays a character or a symbol that is associated with the viewer image.

* * * * *